United States Patent [19]

Kelly et al.

[11] Patent Number: 4,649,420
[45] Date of Patent: Mar. 10, 1987

[54] AUTOMATIC FREQUENCY RESPONSE CORRECTION USING COLOR BURST

[75] Inventors: Gordon E. Kelly, Algonquin; Gopalan Krishnamurthy, Hillside; Jouke N. Rypkema, Lombard, all of Ill.

[73] Assignee: Zenith Electronics Corporation, Glenview, Ill.

[21] Appl. No.: 744,166

[22] Filed: Jun. 12, 1985

[51] Int. Cl.$^4$ .............................................. H04N 9/68
[52] U.S. Cl. ...................................................... 358/38
[58] Field of Search ............................. 358/26, 27, 38

[56] References Cited

U.S. PATENT DOCUMENTS

| | | | |
|---|---|---|---|
| 2,917,572 | 12/1959 | Stubbe | 358/38 |
| 2,934,599 | 4/1960 | Holmes | 358/27 |
| 4,184,173 | 1/1980 | Tamaru | 358/27 |
| 4,237,476 | 12/1980 | Hanma et al. | 358/38 |
| 4,366,498 | 12/1982 | Therrault | 358/38 |

FOREIGN PATENT DOCUMENTS

| | | | |
|---|---|---|---|
| 41136 | 9/1967 | Japan | 358/27 |
| 139334 | 10/1979 | Japan | 358/38 |

*Primary Examiner*—John W. Shepperd

[57] ABSTRACT

A tilt correction circuit for a color television signal processor includes a differential amplifier having a first tuned circuit tuned near the color carrier frequency and a second tuned circuit tuned near the picture carrier frequency. An IF video input signal is applied to the differential amplifier, the output of which reflects the relative effect of the two tuned circuits. A correction voltage is derived by peak detecting the color burst and comparing it with a reference voltage related to a nominal color burst level in a color television signal. The correction voltage is supplied to the other input of the differential amplifier to change the relative effects of the tuned circuits to adjust the frequency response over the IF band. A tilt defeat circuit is included for disabling the correction voltage where the magnitude of the correction voltage indicates the presence of a monochrome signal.

6 Claims, 3 Drawing Figures

AUTOMATIC FREQUENCY RESPONSE CORRECTION USING COLOR BURST

BACKGROUND OF THE INVENTION

This invention relates in general to television signal processing equipment and in particular to means for automatically adjusting the chroma/video response characteristics of such equipment.

The characteristics of broadcast NTSC television signals are closely regulated by the FCC to conform to defined standards. While standards for over-the-air and cable transmissions are not the same, minimum standards are imposed, for example, on the signals delivered by cable converters to television receivers, for retaining signal quality which can be adversely affected by a nonuniform frequency response in the tuner (tuner tilt), intermediate frequency amplifier (IF) response characteristics and non-linearity in the converter circuitry. Generally the major source of difficulty is tuner tilt. In a cable environment, where signals are converted from one frequency to another, the response characteristic at the picture carrier (video) frequency and at the color subcarrier (chroma) frequency may not be within prescribed limits. Quite apart from any resultant degradation in the quality of the processed signal from such a response characteristic, FCC regulations dictate that there be no more than a ±2 dB variation in response between the picture carrier and color subcarrier frequencies. This requirement has militated against the use of so-called single conversion tuners in cable converters.

Single conversion tuners include a local oscillator that is adjustable in frequency for generating, when mixed with an incoming television carrier, a fixed intermediate frequency (IF) output of 45 MHz. The tuner may include three or four varactor diode tuned circuits that must track each other in frequency change over a significant range of D.C. tuning voltage change to achieve a flat frequency response characteristic while one of the tuned circuits (the oscillator) is tuned to a frequency 45 MHz higher. The difficulty of achieving a satisfactory response over all of the television frequency bands and the above-noted FCC requirement of no more than ±2 dB variation between the response at picture carrier and color subcarrier frequencies on cable converters, has dictated the use of double conversion tuning systems. A double converter, or Up Converter as it is often referred to, uses a local oscillator to convert all incoming television signals to a very high frequency (such as 600 MHz), filters the output to select desired channel frequencies and mixes the resultant with a fixed local oscillator at 555 MHz to generate a 45 MHz IF. This arrangement, while cumbersome and expensive, enables the FCC requirement to be met. With the present invention, the need for a double conversion tuning system in a cable environment is obviated and indeed, as will be seen, the bandpass limit specifications on conventional tuners may be relaxed significantly to render usable many tuners having heretofore unacceptable forward and reverse tilts.

OBJECTS OF THE INVENTION

A principal object of the invention is to provide a novel television signal processor.

Another object of the invention is to provide a television signal processor that automatically compensates for deviations in chroma/video frequency response.

A further object of the invention is to provide a television processor having a tuner tilt correction system for automatically adjusting the relative response of the processor at television color subcarrier and picture carrier frequencies.

A still further object of the invention is to provide an automatic chroma/video response correction circuit that enables the use of tuners having heretofore unacceptable frequency response characteristics in television signal processors.

BRIEF DESCRIPTION OF THE DRAWINGS

Further objects and advantages of the invention will be apparent upon reading the following description in conjunction with the drawings in which.

DESCRIPTION OF THE PREFERRED EMBODIMENT

Figure 1:
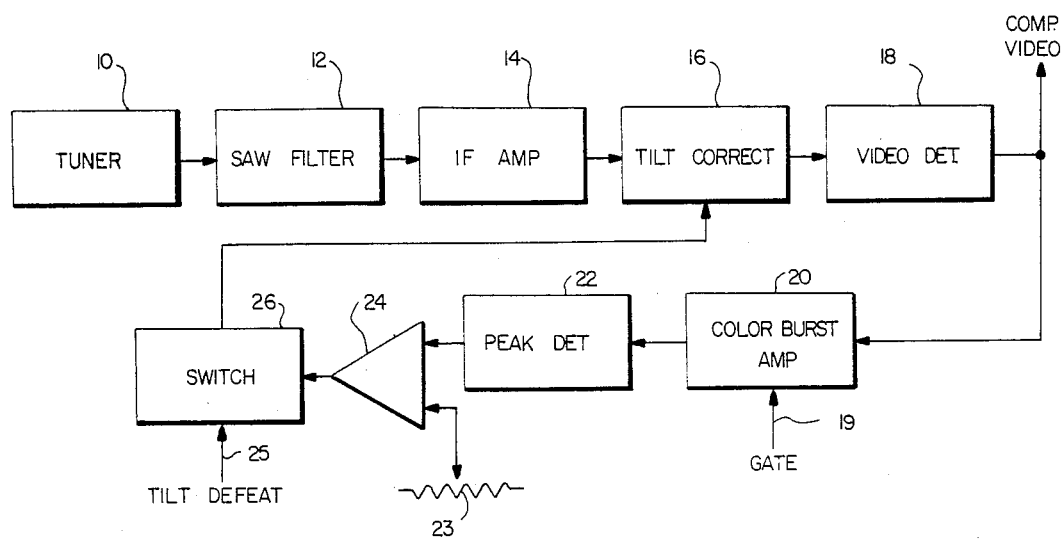
FIG. 1 represents a block diagram of a portion of a television receiver incorporating the invention.

FIG. 1 represents the portion of a television signal processor, such as a conventional television receiver, cable converter, or the like relevant to the present invention. A tuner 10 has an overall frequency response characteristic, which ideally is constant for the frequency band of the tuned channel. For certain channels, non-ideal tracking of the plurality of voltage-tuned circuits (not shown) in the tuner may cause the response characteristic to be tilted toward the picture carrier or toward the color subcarrier. The output of tuner 10 is coupled to a SAW (surface acoustic wave) filter 12 which, in turn, supplies an IF amplifier 14. SAW filter 12 provides a very sharply defined frequency passband for the signals from tuner 10. SAW 12 may, however, be subject to deviations in its response characteristic with temperature. The output of amplifier 14 is supplied to a tilt correction circuit 16 that, in turn, supplies a video detector 18, which may take the form of a synchronous detector. The output of detector 18 supplies a composite video signal to the remaining circuits in the television signal processor (not shown). The detector output is also supplied to a color burst amplifier 20 which, as illustrated, is gated by a separate signal at input 19 that is coincident with the color burst. Burst amplifier 20 supplies a peak detector circuit 22, the output of which is representative of the peak amplitude of the color burst signal. Peak detector 22 is coupled to one input of an operational amplifier 24, the other input of which is connected to a variable voltage reference 23, illustrated as a potentiometer, for setting a reference voltage representative of the nominal color burst level. The output of amplifier 24, as will be seen, comprises a voltage which represents the difference between the amplitude of the detected color burst signal and the reference voltage and is supplied through a switch 26 to tilt correction circuit 16. A tilt defeat voltage is supplied to switch 26 at terminal 25 for disabling switch 26 in the event of reception of a monochrome signal.

The color burst in a color television signal consists of a number of cycles of 3.58 MHz signal transmitted on the back porch of the synchronizing signal, for enabling regeneration of the color subcarrier. The amplitude of the color burst is specified with respect to the amplitude of the synchronizing signal which in turn corresponds to the maximum picture carrier level of the modulated signal. This relationship is used in the present invention to determine whether the television signal processor response characteristic is tilted and to activate compensating automatic tilt correction circuitry.

The block diagram illustrates the general principle of the invention, namely the color burst in the translated signal is sampled and compared with a reference voltage to determine whether it is high or low with respect to the nominal color burst level of a properly received and processed television signal as mentioned above. The reference voltage is set to correspond to that signal level. Deviations of the color burst amplitude with respect to the nominal level cause a tilt correction to be made in the response characteristic and consequent adjustment in the relative response amplitude at frequencies corresponding to the color subcarrier and picture carrier.

Figure 2:
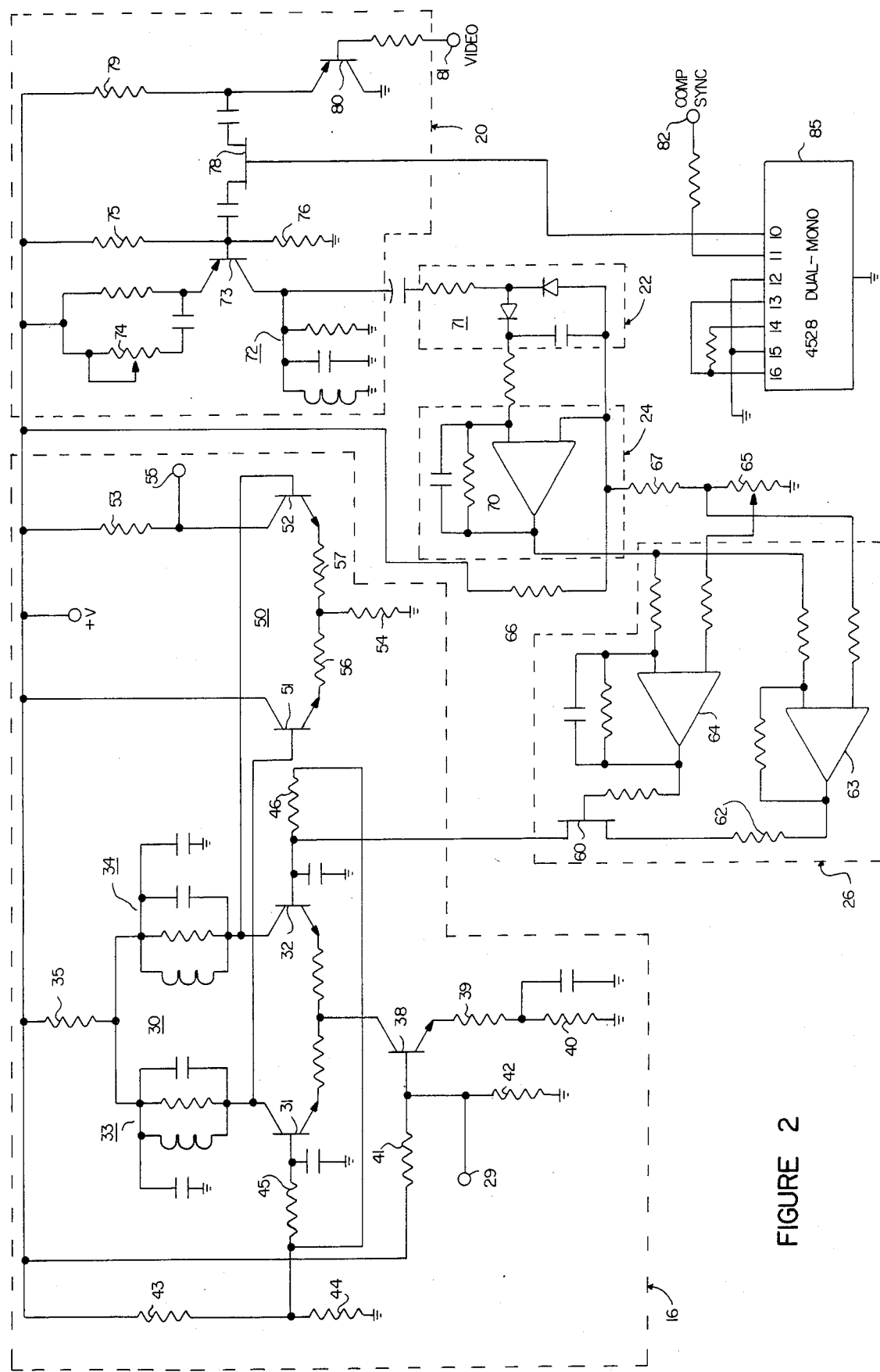
FIG. 2 is a schematic diagram of circuitry for carrying out the invention.

In FIG. 2, the input to the tilt correction circuit is terminal 29 and the output from the tilt correction circuit is terminal 55. The dashed lines generally identify the components of FIG. 2 with the block diagram of FIG. 1. The tilt correction circuit comprises a first differential amplifier 30 including a transistor 31 and a transistor 32 having tuned circuits 33 and 34 connected in their respective collector circuits. A source of positive voltage +V is coupled to the tuned circuits through a resistor 35. One of the tuned circuits is tuned to a frequency close to the 42.17 MHz frequency of the IF color subcarrier, while the other is tuned to a frequency close to the 45.75 MHz IF frequency of the picture carrier. A pair of emitter resistors 36 and 37 connect the emitters of transistors 31 and 32 to the collector of another transistor 38 that has its emitter connected to ground through the series connection of a pair of resistors 39 and 40. Resistor 40 is bypassed by a capacitor 93. The base of transistor 38 and input terminal 29 are connected to the junction of a voltage divider, comprising a pair of resistors 41 and 42, connected between +V and ground. Operating bias for transistor 31 in differential amplifier 30 is supplied from the junction of a voltage divider, consisting of series resistors 43 and 44 connected between +V and ground, through a resistor 45, connected to its base. Similarly operating bias for transistor 32 is supplied from the voltage divider junction through a resistor 46. The base of transistor 32 is supplied with a tilt correction voltage as will be described. Under normal operating conditions, that is with no tilt correction voltage, the current through each tuned circuit 33 and 34 is the same and the frequency response of the circuit to which the television IF signal is applied is essentially flat over the IF pass band from approximately 41-46.5 MHz.

The collectors of transistors 31 and 32 are connected respectively to the bases of transistors 51 and 52, which together comprise another differential amplifier 50. These latter transistors have their emitters connected to a pair of resistors 56 and 57, the junction of which is connected at ground through a resistor 54. The collector of transistor 51 is connected directly to +V, whereas the collector of transistor 52 is coupled to +V through a resistor 53. The collector of transistor 52 supplies output terminal 55. Thus the video IF signal at input terminal 29 is passed through both differential amplifiers 30 and 50 without significant alteration in the absence of a tilt correction voltage at the base of transistor 32. As will be seen, the tilt correction voltage will adjust the relative contributions to the television signal processor response by tuned circuits 33 and 34 in accordance with the tilt correction voltage applied. The overall video IF response will thereby be altered in accordance with the changed response characteristic. Therefore any frequency response tilt between the color subcarrier and the picture carrier will be compensated within prescribed limits.

A composite sync signal derived from a synchronizing signal stripper, or the like (not shown) is supplied at a terminal 82 to a dual monostable multivibrator 85 connected as shown, the output of which supplies the gate of a C-MOS switch 78. A composite video signal is coupled to an input terminal 81 and supplied to the base of a transistor 80 having a grounded collector electrode and an emitter electrode connected to +V through a resistor 79. The emitter is also connected through a capacitor to the input terminal of switch 78, the output terminal of which is capacitively connected to the junction of a voltage divider consisting of two resistors 75 and 76, connected from +V to ground. Multivibrator 85 turns switch 78 on during occurrence of the color burst signal which is gated to the base of a transistor 73. Transistor 73 has a tuned circuit 72 connected to its collector electrode and a gain adjusting potentiometer 74 connected between its emitter electrode and +V. Circuit 72 is tuned to the frequency of the color burst. Thus the output of tuned circuit 72 consists of substantially only the color burst signal. This color burst signal is applied to a peak detector 71, the output of which is supplied to one input of an operational amplifier 70, the other input of which is returned to a reference voltage. The reference voltage is established by a voltage divider, consisting of three resistors 66, 67 and 65 serially connected between +V and ground. Resistor 65 comprises a potentiometer for adjusting the potential applied to one input terminal of an operational amplifier 64, the other input terminal of which is supplied from the output of amplifier 70. Potentiometer 65 will be seen to set a reference voltage level to disable the tilt correction function for monochrome signals. Another operational amplifier 63 has one input terminal connected to the output of amplifier 70 and the other input terminal connected to the junction of resistor 67 and potentiometer 65 in the voltage divider. The output of amplifier 63 is connected to the input electrode of an MOS transistor switch 60 and the output of amplifier 64 is connected to the gate electrode of MOS switch 60. The output of MOS switch 60 is connected to the base of transistor 32 in differential amplifier 30.

The detected color burst signal from peak detector 71 is supplied via amplifier 70 to one input of amplifier 63, the other input of which is connected to a reference source for determining when the amplitude of the color burst is high, low or at the nominal level. The reference voltage level is established to give rise to a correction voltage when the detected color burst amplitude differs from the nominal NTSC value relative to the peak sync level of the video signal stabilized by the AGC circuit. The result of the comparison is a tilt correction voltage, which is a difference voltage from amplifier 63 that varies as a function of the deviation of the color burst amplitude from the prescribed reference voltage. The tilt correction voltage is applied through MOS switch 60 to differential amplifier 30 to change the current distribution between tuned circuits 33 and 34 in accordance with the magnitude of the correction voltage. Thus the frequency response of the differential amplifier is changed and the input video IF signal is subjected to a compensating frequency response tilt imposed by the correction voltage. The output video signal is therefore adjusted with respect to its color subcarrier and picture carrier components. Amplifier 64 functions to disable operation of switch 60 when the color burst is not present, that is, when a monochrome signal is being received. In that event, no tilt correction voltage is produced and both tuned circuits 33 and 34 conduct equal currents.

Figure 3:
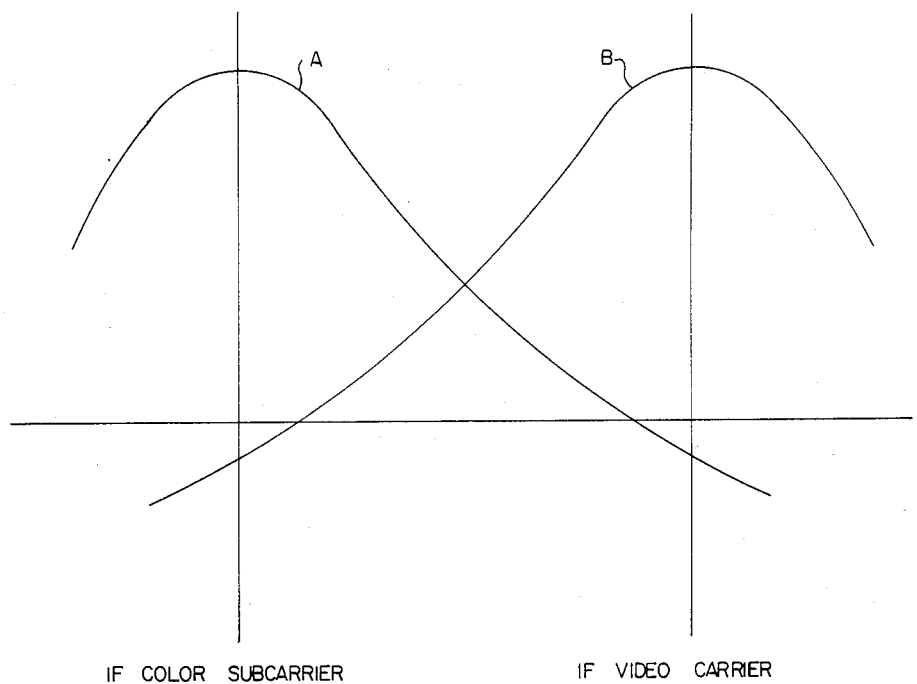
FIG. 3 are response characteristics illustrating the principles of the invention.

FIG. 3 illustrates the effect of the tilt correction voltage on the frequency response characteristic of differential amplifier 30. Specifically, curve A shows the response at IF color subcarrier frequencies being maximized and rolling off significantly as frequencies corresponding to the IF video carrier are approached whereas curve B shows the opposite effect. The center frequency of tuned circuit 33 is approximately 42.5 MHz and that of tuned circuit 34 is approximately 45.75 MHz. Those skilled in this art will appreciate that the exact frequencies are determined with respect to the frequency response correction characteristic desired. The criterion is that the response characteristic in the IF band be essentially flat. As the relative effects of the two tuned circuits are changed, the response seen by frequencies near the center frequencies of the two tuned circuits will be affected to alter the overall IF response of the signal processor. In an actual circuit, the ratios of reactance to resistance (Q's) of tuned circuits 33 and 34 were 8.39 and 9.1, respectively. In tuned circuit 33, the resistor is 560 ohms, the capacitor 56 picofarads and the inductance 0.250 microhenries. Tuned circuit 34 has similar valued resistance and capacitance but the inductance is 0.212 microhenries.

It is recognized that numerous changes in the described embodiment of the invention will be apparent to those skilled in the art without departing from its true spirit and scope. For example, tuned circuits 33 and 34 may comprise more complex networks for providing specific desired correction characteristics. The invention is to be limited only as defined in the claims.

What is claimed is:

1. In combination:

means for receiving a color television signal including color and picture components, said means for receiving comprising a differential amplifier having a pair of tuned circuits, each tuned to a frequency near opposite ends of the IF band;

means for detecting the difference between the level of the color burst in said color television signal and a reference signal, said reference signal comprising a voltage related to the nominal peak color burst level in said color television signal; and means responsive to said detected difference for adjusting the relative levels of said color and picture components of said color television signal.

2. The combination of claim 1 further including tilt correction voltage means for adjusting the conductivity of said tuned circuits responsive to said detected difference for compensatingly adjusting the relative effects of said tuned circuits on signal frequencies within said IF band.

3. The combination of claim 2 further including means for disabling said tilt correction voltage means in the event said detected difference indicates the presence of a monochrome television signal.

4. A television signal processor comprising:

means for receiving a color television signal including a stabilized picture carrier and a color burst signal;

bandpass means exhibiting a substantially flat frequency response over the IF band of said color television signal;

means for detecting the difference between the amplitude of said color burst signal and a reference signal that is based upon the peak detected voltage of a nominal color burst in a standard color television signal; and means, responsive to said detected difference, for adjusting said bandpass means to tilt its frequency response, said means for adjusting comprising a differential amplifier having a pair of tuned circuits, each tuned to a frequency near opposite ends of the IF band.

5. A television signal processor including a tilt correction circuit for maintaining a flat overall frequency response at picture carrier and color carrier frequencies comprising:

means for developing a voltage by detecting said color burst;

means for comparing said voltage with a reference voltage and for producing a correction voltage representative of the comparison;

differential amplifier means including a first tuned circuit tuned to a frequency near the picture carrier frequency and a second tuned circuit tuned to a frequency near the color carrier frequency;

means for supplying said color television signal to one input of said differential amplifier means;

means for supplying said correction voltage to the other input of said differential amplifier means whereby the relative effects of said tuned circuits are varied for compensating the frequency response of said differential amplifier means.

6. The processor of claim 5 wherein said means for developing a voltage comprising a peak detector and further including:

means for disabling said tilt correction circuit when the magnitude of said correction voltage indicates the presence of a monochrome signal.

* * * * *